United States Patent [19]

Simmons

[11] Patent Number: 4,637,156

[45] Date of Patent: Jan. 20, 1987

[54] ROD HOLDER

[75] Inventor: Billy R. Simmons, Odenville, Ala.

[73] Assignee: Nancy B. Crews, Odenville, Ala. ; a part interest

[21] Appl. No.: 875,972

[22] Filed: Jun. 19, 1986

[51] Int. Cl.$^4$ .............................................. A01K 97/10
[52] U.S. Cl. ..................................... 43/21.2; 248/514
[58] Field of Search ................... 43/21.2, 17; 248/514, 248/520, 523, 538, 541

[56] References Cited

U.S. PATENT DOCUMENTS

| | | | |
|---|---|---|---|
| 2,724,569 | 11/1955 | Licata | 43/21.2 |
| 2,899,155 | 8/1959 | Rogers | 248/514 |
| 3,285,360 | 11/1966 | Wetsch | 43/21.2 |
| 3,835,462 | 9/1974 | Periman | 43/17 |
| 3,992,798 | 11/1976 | Schmitt, Sr. | 43/21.2 |
| 4,486,968 | 12/1984 | Gould | 43/21.2 |

*Primary Examiner*—Nicholas P. Godici
*Assistant Examiner*—Karen Skillman
*Attorney, Agent, or Firm*—Jennings, Carter, Thompson & Veal

[57] ABSTRACT

An improved fishing rod holder uses a spring loaded tubular receptacle within which the rod is placed. A fixed locking element extends within the tubular receptacle and provides a fulcrum on which the rod pivots such that force applied to the rod tip increases the gripping force applied to the rod. Removal and insertion of the rod is accomplished by pivoting the tubular receptacle relative to the locking element.

14 Claims, 3 Drawing Figures

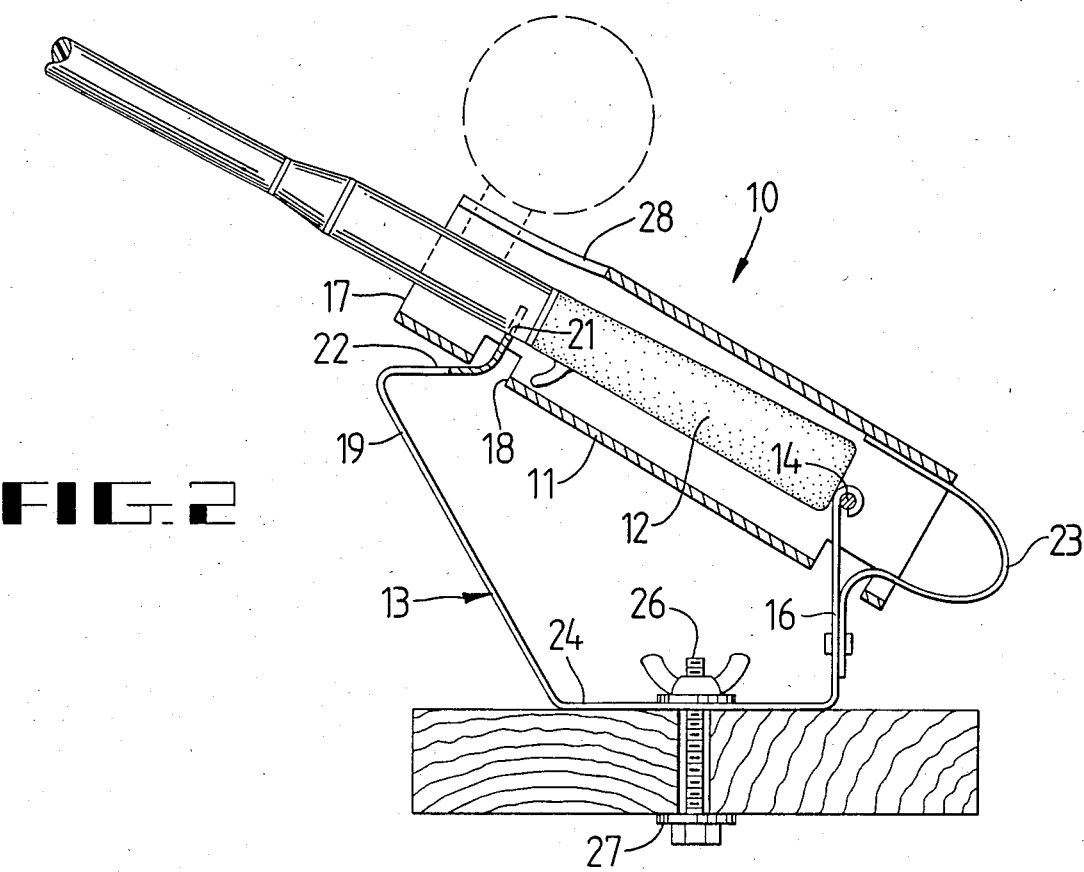
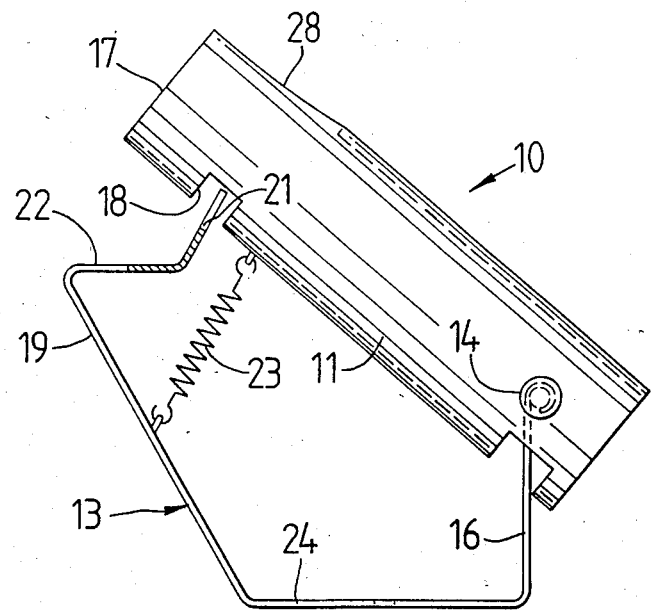

ROD HOLDER

FIELD OF THE INVENTION

The present invention relates to fishing equipment in general and particularly to an improved rod holder for positioning a rod on a pier, dock, or gunwale such that the rod may be picked up by the fisherman but cannot be dislodged by a fish.

BACKGROUND OF THE INVENTION

Pier fishermen and fishermen who troll with rods and reels have devised a number of rod holders which are to hold the rod until the fish strikes the bait or lure. The simplest of these consists of a loop into which the butt of a rod is inserted in combination with a y-shaped brace into which the rod is laid. More complicated fishing rod holders use a variety of openable clamps which open when force is applied in a direction perpendicular to the rod butt yet resist opening when force is applied at the rod tip. Unfortunately, most of the known devices either do not allow the rod to be readily removed or else allow the rod to be too easily removed such that the rod is displaced from the holder before the fisherman can react. Another problem, frequently encountered while trolling, is the tendency of the rod to rebound responsive to encountering a temporary snag on the bottom. When the rod rebounds, it applies the same force as is required to open the clamp type rod holders. Consequently, numerous rod and reel combinations have been lost overboard from prior rod and reel holders due to fish or bottom action and many fish have been lost because the rod was not readily retractable.

SUMMARY OF THE INVENTION

It is the object of the present invention to provide a rod holder which provides quick manual release of the rod yet which is highly resistant to unintended dislodgement.

Another object of the invention is to provide such a rod holder which can be mounted to a dock, pier or boat gunwale.

To accomplish these and other objects, my invention utilizes a tubular member within which the rod handle is inserted. The tubular member is pivotally mounted to a bracket such that the movable end thereof in which the rod is inserted may be varied in elevation. The tubular member has a transverse slot therein near the movable end through which an upright locking member may be inserted. The locking member engages and supports the rod handle such that the butt of the rod handle rests against the upper inner surface of the tubular member proximal the lowermost end of the tubular member and the shank of the rod handle rests against the lower inner surface of the tubular member proximal the open, upper end thereof. The locking member and its support bracket are sized such that the tubular member and rod are held at an angle between 20° and 60° from horizontal. Thus, any force exerted on the rod tip by the line urges the rod handle into tighter engagement with the tubular member and the locking member. A spring is provided to bias the uppermost end of the tubular member downward to prevent inadvertent release due to the rebound effect.

BRIEF DESCRIPTION OF THE DRAWINGS

Apparatus embodying features of my invention are illustrated in the accompanying drawings which form a portion of this application and wherein:

FIG. 2 is a side elevational view, partially in section, showing my rod holder with a rod handle inserted; and, FIG. 3 is a side elevational view of an alternate embodiment of my invention shown in the open position.

DESCRIPTION OF A PREFERRED EMBODIMENT

Figure 1:
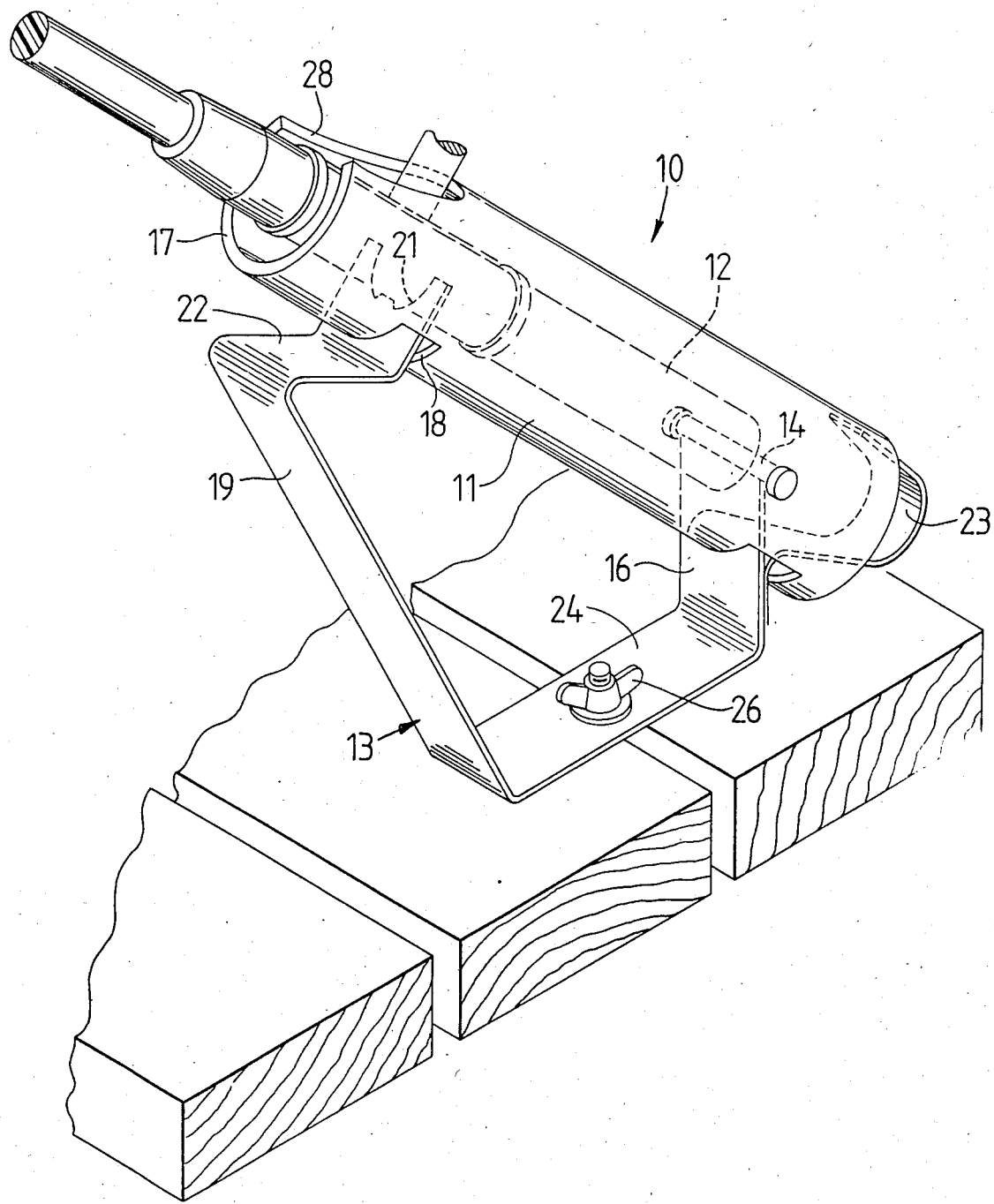
FIG. 1 is a perspective view of my rod holder mounted to a dock.

Referring to FIGS. 1 and 2, my improved rod holder 10 utilizes a tubular member 11 which is the receiver for a handle 12 of a typical fishing rod and reel combination. It is to be understood that the dimension of the handle 12 dictates the dimension of the tubular member 11, however, in general, the tubular member 11 is somewhat greater in length and diameter than is the rod handle 12. The tubular member 11 is pivotally mounted near one end thereof to one element of a bracket like member 13 by suitable means, such as a pin 14 carried by an upright arm 16 of the bracket member 13 and extending transversely through suitable openings in the tubular member. A second end 17 of the tubular member 11 receives the rod handle 12. A transverse slot 18 is formed in the underside of the tubular member 11 proximal the second end 17 to accommodate an upright locking element 19 which extends through the slot 18 into the tubular member 11. The locking element 19 has a concave end 21 configured to cooperatively engage the rod handle 12. The concave end may be roughened or segmented to increase the sliding friction between the locking element 19 and the rod handle. A stop 22 is formed on the locking element 19 to limit the downward travel of tubular member 11. It should be noted that the locking element 19 may be formed as part of the mounting bracket member 13 for portable installation or may be separately formed. In either case the tubular member 11 should be supported with a normal inclination of 20° to 60° from horizontal.

The tubular member 11 is biased downwardly by a spring 23 shown as a spring steel element in FIGS. 1 and 2 and as a tension spring in FIG. 3. The bracket member 13 has a horizontal portion 24 extending between the locking element 19 and the upright arm 16. The horizontal portion 24 carries a bolt 26 and washer 27 combination which can be inserted between the planks of a dock and secured, or which can be used to secure the rod holder to a boat.

In operation, the rod handle 12 is inserted into the tubular member 11 by inserting the butt into the open end and lifting up slightly. The handle 12 may then be urged past the locking element 19 until the reel is seated in a recess 28 formed in the top of the tubular member 11. Rod handles having trigger elements may be advanced to position the trigger behind the locking element although the holder 10 works just as well without the trigger. When the rod is released, the handle 12 is engaged by the locking element 19 and the interior of the tubular member 11 such that the locking element 19 acts as a fulcrum for the rod and a force exerted along the fishing line at the rod tip urges the butt of the rod upward against the inner surface of the tubular member 11 and the shank of the rod downward against the tubular member at the open end. Thus such a force serves only to urge the handle more tightly against the locking element 19. If the force is suddenly released and the rod "rebounds" the spring 23 keeps the tubular member 11 biased downwardly to hold the rod in place. To remove the rod, the fisherman simply grasps the rod near the reel and lifts up in a natural motion. The tubular member 11 pivots away from the locking element and the handle can be freely withdrawn. In as much as there are no clamps to malfunction, the insertion and withdrawal of the rod is extremely efficient. Consequently, no cumbersome sequence of events must be mastered to successfully use my invention yet it provides greater reliability and security than any known holder.

While I have shown my invention in but two forms, it will be obvious to those skilled in the art that it is not so limited but is susceptible of various other changes and modifications without departing from the spirit thereof.

What I claim is:

1. Apparatus for holding a fishing rod having a handle portion and a reel mounting bracket, comprising:
   (a) a tubular member having a length greater than the handle portion of said rod and a diameter greater than said handle portion and having a transverse slot through its under surface near one end thereof;
   (b) a mounting bracket pivotally attached to said tubular member distal said one end and having a first upright portion extending upwards through said transverse slot;
   (c) spring means for biasing said one end downwardly; and
   (d) means for fastening said mounting bracket to a support surface.

2. Apparatus as defined in claim 1 wherein said tubular member has a longitudinally extending recess at the upper portion of said one end.

3. Apparatus as defined in claim 1 wherein said mounting bracket further comprises:
   (a) second upright portion attached to said tubular member distal said one end, said second upright portion being shorter than said first upright portion such that said tubular member is supported at an angle of 20° to 60° from horizontal alignment; and
   (b) a horizontal base portion connecting said first upright portion and said second upright portion.

4. Apparatus as defined in claim 3 wherein said spring means comprise a spring steel element connected between said second upright portion and said tubular member.

5. Apparatus as defined in claim 4 wherein the end of said first upright portion is generally concave transversely to said tubular member such that a rod handle inserted in said one end is engaged thereby about a portion of its circumference.

6. Apparatus as defined in claim 5 wherein said first upright portion includes a stop engagable with said tubular member to limit the downward motion thereof.

7. Apparatus as defined in claim 1 wherein said spring means comprises a formed spring steel loop connected between said mounting bracket and said tubular element.

8. Apparatus as defined in claim 1 wherein said first upright portion is adapted to engage a rod handle inserted in said one end.

9. Apparatus as defined in claim 1 wherein said spring means comprises a tension spring connected between said mounting bracket and said tubular element.

10. Apparatus for holding a fishing rod having a handle and a reel carrying bracket, comprising:
    (a) a tubular member for receiving said rod handle pivotally mounted at one end and having a transverse slot through its under surface proximal a second end thereof;
    (b) a fixed upright member extending through said transverse slot to engage a rod handle within said tubular member such that said rod handle is constrained to pivot on said upright member responsive to forces acting on said rod at the tip thereof; and
    (c) means for biasing said tubular member downward to maintain engagement of said upright member within said transverse slot.

11. Apparatus as defined in claim 10 further comprising:
    (a) a mounting bracket pivotally connected to said tubular member at said one end and adapted to form said fixed upright member; and
    (b) means for attaching said mounting bracket to a supporting surface.

12. Apparatus as defined in claim 10 wherein said tubular member is supported at an inclination of between 20° and 60° from the horizontal.

13. Apparatus as defined in claim 10 wherein said first upright portion includes a stop engagable with said tubular member to limit the downward motion thereof.

14. Apparatus as defined in claim 10 wherein said tubular member has a longitudinally extending recess at the upper portion of said one end.

* * * * *